Patented Apr. 20, 1943

2,316,842

UNITED STATES PATENT OFFICE 2,316,842

LEAK TESTING BATH AND METHOD OF THE TESTING

John D. Coleman, Dayton, Ohio, assignor to General Motors Corporation, Dayton, Ohio, a corporation of Delaware No Drawing. Application November 18, 1939, Serial No. 305,209

3 Claims. (Cl. 73—51)

This invention relates to leak testing and leak testing baths.

It has been customary in testing for leaks in containers of various sorts to fill the container with air, hydrogen or nitrogen under pressure and submerge the container in a bath of water. It has been found, however, that the water has a sufficiently high surface tension to cause the air leaking through a small leak in the container to remain at the point of leakage in the form of a bubble for a considerable length of time. This delays and sometimes prevents detection of the leak.

It is an object of my invention to provide an improved process of leak testing and particularly a leak testing bath which has a low surface tension and which is very clear regardless of the water used in the bath.

It is also an object of my invention to provide a leak testing bath which provides a rapid and readily discernible indication of any leakage of the container.

I have found by adding a polyether alcohol or polyether alcohol derivative or compound to the water in a leak testing bath that air, hydrogen or nitrogen leaking from the container through a very small opening will issue therefrom and pass directly upwardly through the solution in a steady stream which is easily detected. The solution remains perfectly clear with hard water because of the stability of the polyether alcohols or compounds and derivatives. I prefer to use products having the general formula $$C_nH_{2n+1}—(—O—C_2H_4—)_x—O—CH_2—CH_2—OH$$

in which $n$ is 6 or any integral number greater than 6 and $x$ is 3 or any integral number greater than 3.

I prefer to use those polyether compounds which contain terminal alcohols of 12 to 14 carbon atoms. These compounds exhibit great stability to calcium and magnesium salts encountered in hard water as well as other impurities which might be present in a leak testing bath.

Only a very small amount of this compound is required in water. This amount is less than one tenth of one percent and preferably about one twenty-fifth of one percent or less. This small amount appears to be ample for normal use and will provide very satisfactory leak detection.

While the form of embodiment of the invention as herein disclosed, constitutes a preferred form, it is to be understood that other forms might be adopted, all coming within the scope of the claims which follow.

What is claimed is as follows:

1. The process of leak testing which comprises the steps of immersing a container being tested in a bath of an aqueous solution of a polyether alcohol derivative and while so immersed subjecting said container being tested to internal fluid pressure and observing the escape of air bubbles from leaks in said container.

2. The process of leak testing which comprises the steps of immersing a container being tested in a bath containing a small amount of a polyether alcohol derivative and while so immersed subjecting said container being tested to internal fluid pressure and observing the escape of air bubbles from leaks in said container.

3. A leak testing bath in which leaks in containers are detected by bubbling air through the leaks comprising a substantially clear aqueous solution of a polyether alcohol derivative.

JOHN D. COLEMAN.